United States Patent
Becker-Irvin et al.

(10) Patent No.: US 10,050,252 B2
(45) Date of Patent: Aug. 14, 2018

(54) FAULT TOLERANT BATTERY CELL BYPASS DEVICE AND SYSTEM

(71) Applicant: The Boeing Company, Huntington Beach, CA (US)

(72) Inventors: Craig H. Becker-Irvin, Redondo Beach, CA (US); Allen R. Powers, Palos Verdes Estates, CA (US)

(73) Assignee: THE BOEING COMPANY, Chicago, IL (US)

( * ) Notice: Subject to any disclaimer, the term of this patent is extended or adjusted under 35 U.S.C. 154(b) by 592 days.

(21) Appl. No.: 14/689,488

(22) Filed: Apr. 17, 2015

(65) Prior Publication Data

US 2016/0308191 A1   Oct. 20, 2016

(51) Int. Cl.
*H01M 2/34* (2006.01)
*H01M 10/42* (2006.01)
*H01M 10/0525* (2010.01)

(52) U.S. Cl.
CPC ........... *H01M 2/348* (2013.01); *H01M 2/342* (2013.01); *H01M 10/425* (2013.01); *H01M 10/0525* (2013.01); *H01M 2010/4271* (2013.01); *H01M 2200/103* (2013.01); *H01M 2220/20* (2013.01); *H01M 2220/30* (2013.01); *Y02E 60/122* (2013.01)

(58) Field of Classification Search
None
See application file for complete search history.

(56) References Cited

U.S. PATENT DOCUMENTS 4,879,188 A * 11/1989 Meinhold ............... H01M 2/34
 429/103
6,229,282 B1 * 5/2001 Stadnick ................. H01M 2/34
 257/665

* cited by examiner

*Primary Examiner* — Scott J. Chmielecki
(74) *Attorney, Agent, or Firm* — MH2 Technology Law Group LLP

(57) ABSTRACT

A fault tolerant battery system includes an electrical storage cell having a positive terminal and a negative terminal. The electrical storage cell is provided with a normally open bypass circuit path that is closed in the event of an overdischarged, or open-circuit failure of, the electrical storage cell. The bypass circuit path includes a first electrical conductor connected to the negative terminal of the electrical storage cell, a second electrical conductor connected to the positive terminal of the electrical storage cell, and a shorting gap between the first electrical conductor and the second electrical conductor. The first and second electrical conductors and a non-conductive barrier define an enclosed chamber that encompasses a mass of a fusible material, a spring that is positioned to force the mass of the fusible material into the shorting gap when the mass of the fusible material is at least partially molten, and a heat source is activatable upon the occurrence of the failed electrical storage cell. Two diodes connected in electrical series serve as heat sources, one of which is operable to melt at least a portion of the mass of the fusible material and one of which is operable to heat the conductive web. The chamber entraps the partially molten fusible material such that the spring forces the molten material into the shorting gap, where it closes the shorting gap so that the first electrical conductor is in electrical communication with the second electrical conductor.

23 Claims, 4 Drawing Sheets

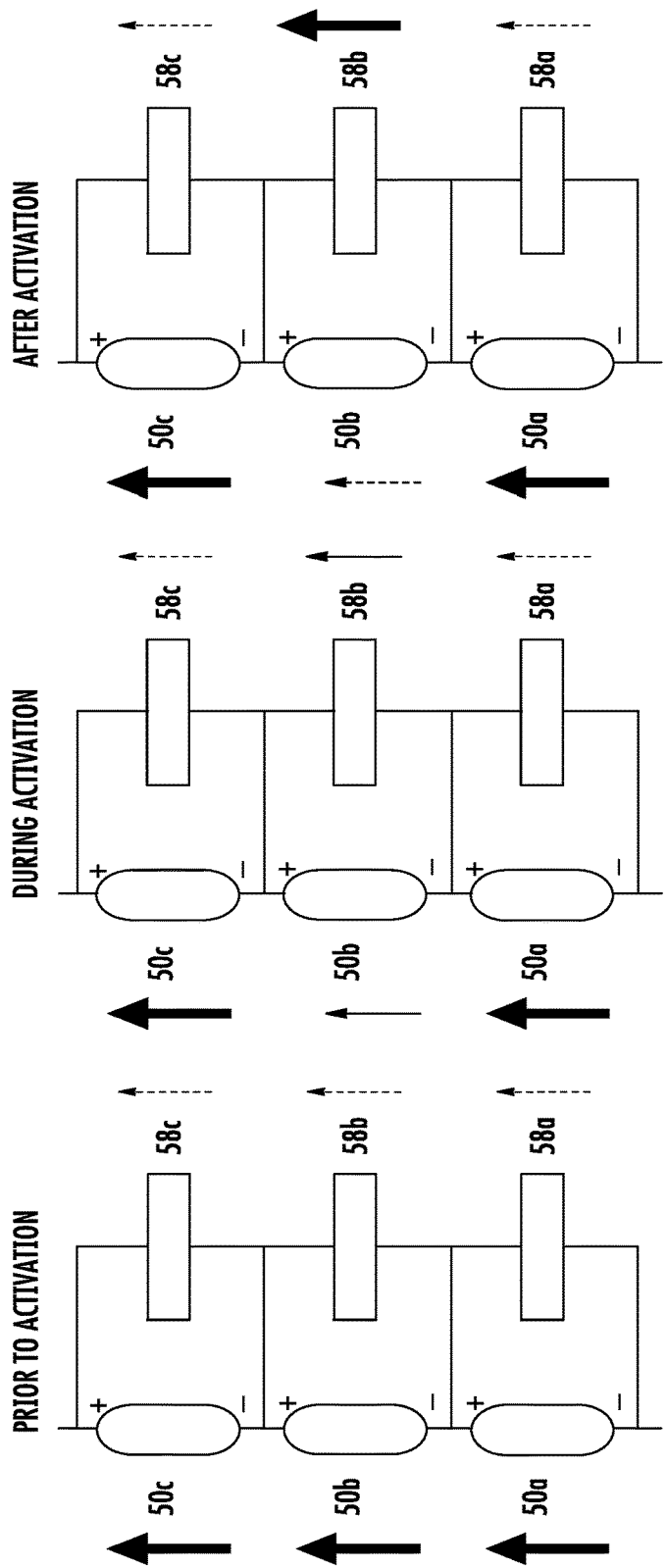

FAULT TOLERANT BATTERY CELL BYPASS DEVICE AND SYSTEM

TECHNOLOGICAL FIELD

The present disclosure relates generally to electrical storage batteries, and, in particular, to a fault tolerant battery cell bypass device and system.

BACKGROUND

Rechargeable cells or batteries are electrochemical energy storage devices for storing and retaining an electrical charge and later delivering that charge as useful power. Familiar examples of rechargeable electrical storage cells are lithium-ion (Li-on) cells and nickel-cadmium cells used in various portable devices and lead-acid cells used in automobiles. Another type of electrical storage cell is the nickel oxide/pressurized hydrogen electrical storage cell, commonly called the nickel-hydrogen electrical storage cell, which is used in spacecraft applications.

Although electrical storage cells are designed for excellent reliability, there is always the chance of a failure. One common failure is when a cell, in a battery comprised of an array of series-connected cells, is defective and, therefore, has diminished storage capacity. When the battery discharges, the defective cell fully discharges prior to the other non-defective cells in the array. As the battery remains in discharge mode, the defective cell becomes overdischarged resulting in a reversal of the defective cell's voltage. This adversely affects the battery's operation because the defective cell is no longer able to carry the same current load as the other cells in the array. Another common failure is when there is an open-circuit failure, in which there is no longer a conducting path through the cell. In the event of such open-circuit failure of a single cell in a series-connected array of cells, all of the storage capacity of the array is lost. In a spacecraft battery, for example, a loss of the battery's storage capacity can lead to failure of the mission.

A bypass around a potentially defective or failed cell is required to prevent loss of the storage capacity of the entire array. The bypass must not conduct when the electrical storage cell is functioning properly, but it must activate to provide an electrically conductive bypass when the electrical storage cell fails. An example circuit diagram for a prior art bypass device 10 is shown in FIG. 1, in which a diode 22 is connected across the cell 20 such that the cathode of the diode 22 is connected to the positive terminal of the cell 20, and the anode of the diode 22 is connected to the negative terminal of the cell 20. If the voltage across the diode 22 is negative at the anode and positive at the cathode, as in normal operation of the cell 20, no significant current flows through the diode 22. If the cell 20 fails to an open-cell condition, for example, the voltage across the diode 22 reverses, and current flows through the diode 22 in the forward direction. Current flowing through the diode 22 causes the diode 22 to heat substantially, to at least 183 degrees C. A mass of a fusible material 24 is positioned at an initial mass location such that it is not within the shorting gap 30, but such that it is heated and melted by the heat produced by the diode 22. The melted fusible material 24 is driven into the shorting gap 30 and serves to cause the shorting gap 30 to be closed, which closure is indicated schematically by a switch 32 in FIG. 1.

The prior art bypass device circuitry shown in FIG. 1 has a significant shortcoming because if the single diode 22 suffers a short-circuit failure, the bypass device 10 could be inadvertently activated even when the cell 20 is not defective or in an open-cell condition. This could cause the cell 20 to overheat, vent, and cause a fire. Even apart from the use of a single diode 22, the prior art bypass circuitry is activated only when the heat from the diode 22 creates an effective thermal path to the fusible material 24, such that the fusible material 24 melts. If the heat dissipates as it travels along the thermal path from the diode 22 to the fusible material 24 such that it is then insufficient for heating the fusible material 24, the bypass device 10 fails. Finally, in the prior art bypass device 10, the fusible material 24 is unconstrained, which means that the molten flow is not guaranteed to close the shorting gap 30 for activation of the device, thereby resulting in device unreliability.

Thus, there is a need in the art for an improved technique for achieving an electrical bypass of electrical storage cells. The present invention fulfills that need, and further provides related advantages.

BRIEF SUMMARY

In view of the foregoing background, example implementations of the present disclosure provide a battery system including an electrical storage cell having a positive terminal and a negative terminal and a normally open bypass circuit path. The normally open bypass circuit path includes a first electrical conductor connected to the negative terminal of the electrical storage cell, a second electrical conductor connected to the positive terminal of the electrical storage cell, and a shorting gap between the first electrical conductor and the second electrical conductor. The battery system further includes a mass of electrically conductive fusible material, and first and second diodes electrically connected in series. The fusible material may be a metal, such as a metal alloy. The fusible material has a melting point of no more than about 183 degrees C.

Each of the first and second diodes has a cathode and an anode, the anode of the first diode being electrically connected to the negative terminal of the electrical storage cell and the cathode of the second diode being electrically connected to the positive terminal of the electrical storage cell. Each of the first and second diodes is heat source activatable upon the occurrence of a voltage reversal of the electrical storage cell. The first diode has a sufficient heat output to melt the mass of the fusible metallic alloy. A biasing mechanism, such as a spring, is positioned to force the mass of the fusible material into the shorting gap, when the mass of the fusible material is at least partially molten, thereby closing the shorting gap so that the first electrical conductor is in electrical communication with the second electrical conductor.

The battery system further includes a nonconductive barrier disposed between the first electrical conductor and the second electrical conductor to define a bypass chamber that encloses the mass of fusible material, first and second diodes, gap, biasing mechanism, and shorting gap. The bypass chamber entraps the mass of the fusible material when it is at least partially molten.

The normally open bypass circuit path may also include an electrically conductive web that it is electrically connected to the second conductor, the web being disposed within the chamber. The shorting gap is disposed between the web and the first conductor, and the biasing mechanism forces the mass of the fusible material into the shorting gap, when the mass of the fusible material is at least partially molten, thereby closing the shorting gap so that the first electrical conductor is in electrical communication with the second electrical conductor via the web. The second diode has a sufficient heat output to heat the web.

In example implementations, the chamber further encloses an electrically conductive spreader that is disposed between the fusible material and the first diode. Also, the battery system may include a second electrical storage cell in an electrical series relationship.

Example implementations of the present disclosure further provide a battery system including an electrical storage cell having a positive terminal and a negative terminal and a normally open bypass circuit path. The normally open bypass circuit path includes a first electrical conductor connected to the negative terminal of the electrical storage cell, a second electrical conductor connected to the positive terminal of the electrical storage cell, and a shorting gap between the first electrical conductor and the second electrical conductor. The battery system further includes a mass of fusible material, a heat source activatable upon the occurrence of a voltage reversal of the electrical storage cell, the heat source being operable to melt at least a portion of the mass of the fusible material, and a biasing mechanism positioned to force the mass of the fusible material into the shorting gap when the mass of the fusible material is at least partially molten, thereby closing the shorting gap so that the first electrical conductor is in electrical communication with the second electrical conductor.

The mass of fusible material, heat source, and biasing mechanism are disposed within an enclosed bypass chamber defined by the first electrical conductor, the second electrical conductor, and a nonconductive barrier disposed between the first electrical conductor and the second electrical conductor. The bypass chamber entraps the mass of the fusible material when it is at least partially molten.

The normally open bypass circuit path further includes an electrically conductive web that it is electrically connected to the second conductor within the chamber such that the shorting gap is disposed between the web and the first conductor, and the biasing mechanism forces the mass of the fusible material into the shorting gap, when the mass of the fusible material is at least partially molten, thereby closing the shorting gap so that the first electrical conductor is in electrical communication with the second electrical conductor via the web.

BRIEF DESCRIPTION OF THE DRAWING(S)

Having thus described example implementations of the disclosure in general terms, reference will now be made to the accompanying drawings, which are not necessarily drawn to scale, and wherein:

FIG. 7A is a schematic diagram of a battery system prior to activation of a battery bypass device according to the example implementation of FIG. 3;

FIG. 7B is a schematic diagram of a battery system during activation of a battery bypass device according to the example implementation of FIG. 4; and FIG. 7C is a schematic diagram of a battery system after activation of a battery bypass device according to the example implementation of FIG. 5.

DETAILED DESCRIPTION

Figure 1:
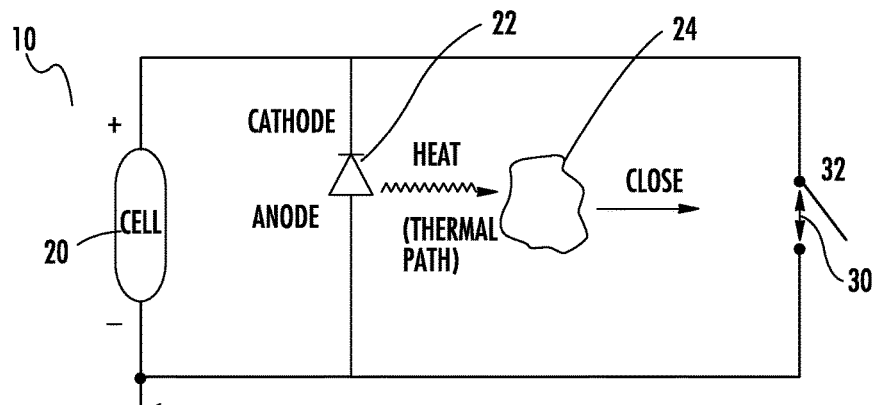
FIG. 1 is a schematic circuit diagram of a prior art battery bypass device.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure relate generally to an apparatus and system for sensing a failed cell in a battery and bypassing such failed cell to restore near-normal operation of the battery.

Figure 2:
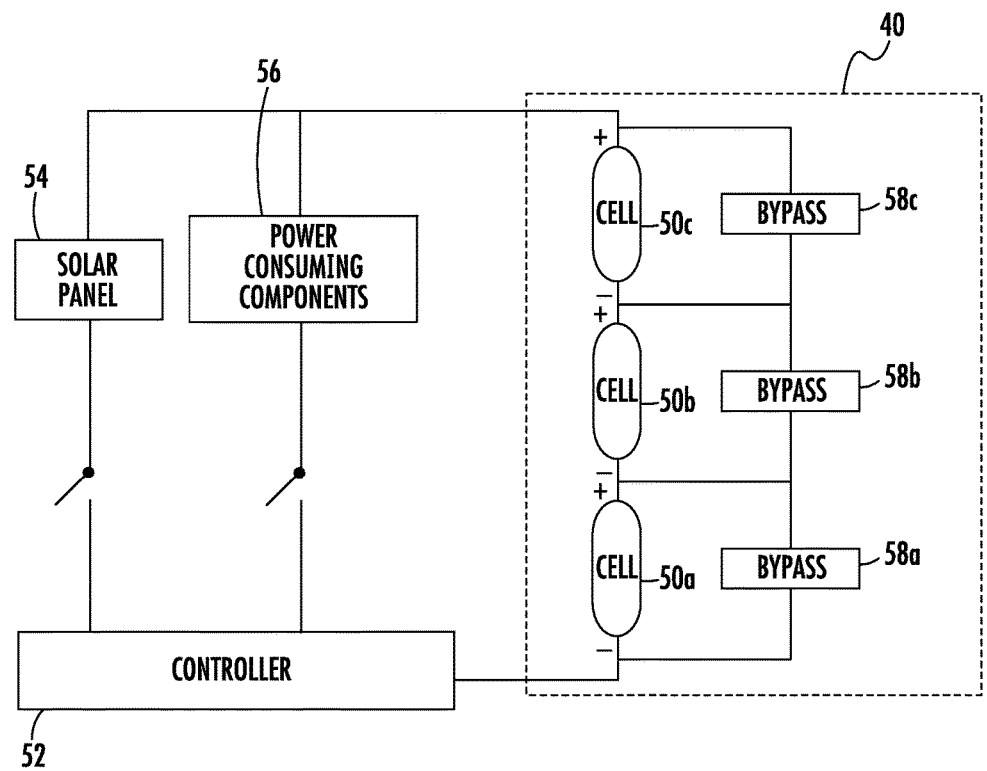
FIG. 2 is a schematic diagram of a battery system according to an example implementation of the present disclosure.

FIG. 2 illustrates a battery 40 having three electrical storage cells 50a, 50b, and 50c in an electrical series relationship in accordance with an implementation of the present disclosure, although in practice the number of electrical storage cells 50 in series is usually greater. In this example implementation, via operation through a controller 52, the electrical storage cells 50 are charged by a solar panel power supply 54 and discharge to provide power to consuming components 56. More specifically, the battery 40 goes into discharge mode when the demand for power from the consuming components 56 can't be satisfied by the solar panel supply 54, such as during an eclipse.

As noted above, one common failure mode of electrical storage cells 50, such as lithium ion cells, is when a cell 50 in an array of series-connected cells 50 is defective and, therefore, has diminished storage capacity. When the battery 40 discharges, the defective cell 50 fully discharges prior to the other non-defective cells 50, which ultimately results in the defective cell 50 being overdischarged and having a negative voltage. Another example of a failure mode is an open-circuit failure, in which there is no longer a conducting path through the cell 50. In both of these examples of cell 50 failures, the consequences of such failures are compounded because the storage cell 50 is in electrical series with other cells 50 in the battery 40. Specifically, the other electrical cells 50 in the battery 40 are rendered useless by the failure of the defective cell 50 unless a suitable bypass is provided to remove the failed cell 50 from the series arrangement. Thus, in the example implementation of the present disclosure shown in FIG. 2, a bypass 58 is provided for each storage cell 50 in the array. Particularly, there is a bypass 58a for cell 50a, a bypass 58b for cell 50b, and a bypass 58c for cell 50c. When the cells 50 functions normally, the corresponding bypasses 58 are inactive and carry no current. Upon failure of a cell 50, the corresponding bypass 58 becomes active and carries current around the failed cell 50. The remaining properly functioning cells 50 continue to store and deliver power, so the battery as a whole continues to store and deliver power, but at a diminished voltage because one of the cells is at zero volts.

Figure 3:
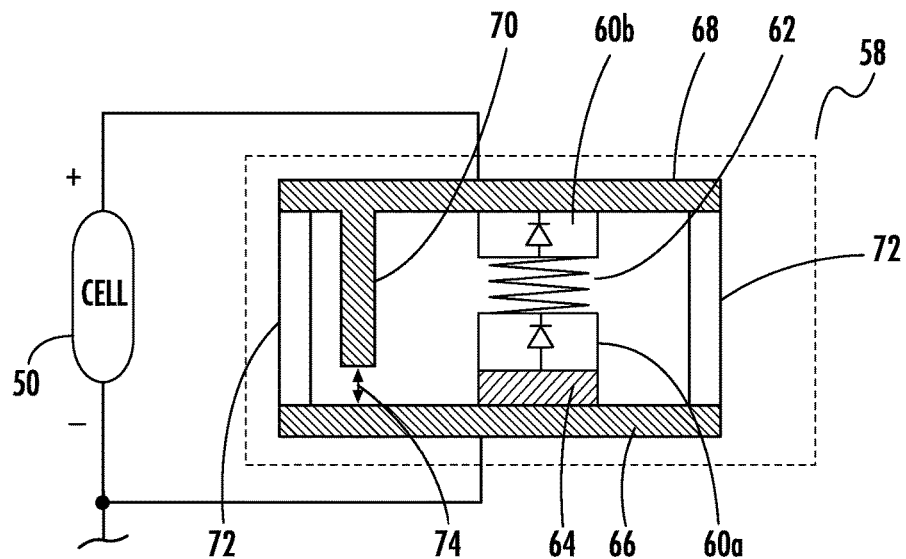
FIG. 3 is a schematic diagram of a battery bypass device prior to activation according to an example implementation of the present disclosure.

FIG. 3 illustrates the bypass device 58 according to example implementations of the present disclosure, in which the bypass device 58 is an enclosed chamber with borders defined by: a first electrical conductor 66; a second electrical conductor 68; and an electrically non-conductive barrier 72 that is disposed between the first conductor 66 and the second conductor 68. In the implementation shown in FIG. 3, the non-conductive barrier 72 is cylindrically disposed between the first conductor 66 and the second conductor 68. It should be understood, however, that the present disclosure is not limited to the non-conductive barrier 72 being cylindrically shaped. Rather, the barrier 72 could be a different shape with walls that still nonetheless form the chamber. The non-conductive barrier 72 may be formed from material such as plastic with a high melting temperature or ceramic.

Disposed within the enclosed chamber of the bypass device 58 are: a mass of electrically conductive fusible material 64; a first diode 60*a*; an electrically conductive biasing mechanism such as a spring 62; a second diode 60*b*; and an electrically conductive web 70 that is electrically connected to the second conductor 68. Even though spring 62 physically separates the first diode 60*a* and the second diode 60*b*, the pair of diodes 60 are connected in electrical series. A shorting gap 74 prevents the web 70 from electrically connecting the first conductor 66 to the second conductor 68, thereby electrically isolating the battery cell's 50 positive and negative terminals.

The bypass device 58 is connected to the battery cell 50 such that the anode of the first diode 60*a* is electrically connected to the negative terminal of the cell 50 by means of the first electrical conductor 66 and the fusible material 64. The cathode of the second diode 60*b* is electrically connected to the positive terminal of the cell 50 by means of the second conductor 68. Thus, the first conductor 66, fusible material 64, pair of diodes 60 and second conductor 68 are electrically connected through physical contact and compression provided by the conductive spring 62.

In example implementations of the present disclosure, in order to minimize the voltage difference between the second conductor 68 and the first conductor 66, the diodes 60 are selected such that the sum of the forward voltage drops is minimized. For example, it is optimal for the voltage drop across the bypass device 58 to be less than the voltage at which copper plating occurs in a lithium ion cell because the copper plating internally shorts the cell. One example of suitable diode is a Schottky diode. By minimizing the sum of the voltage forward drops of the diodes 60, the bypass device 58 is activated at a lower voltage than the voltage level at which copper plating begins.

Figure 4:
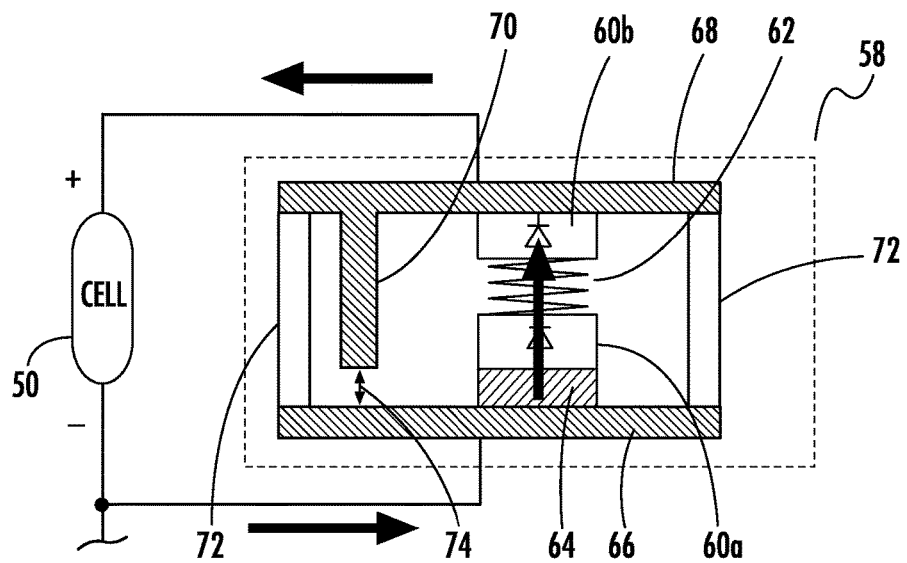
FIG. 4 is a schematic diagram of a battery bypass device during activation according to an example implementation of the present disclosure.

Referring again to FIG. 3, during normal operation of the cell 50, the voltage across the pair of series connected diodes 60 is negative at the anodes and positive at the cathodes, respectively, so no significant current flows through the diodes 60. However, if the voltage of the cell 50 is reversed during a discharge operation, such as because the cell 50 has been overdischarged or because the cell 50 has failed to an open-cell condition, the current flows from the cell's 50 negative terminal through the first conductor 66, the fusible material 64, the first diode 60*a*, the spring 62, and the second diode 60*b* to the second conductor 68, as illustrated in FIG. 4. The diodes 60 are sized so that this forward flow of current through the diodes 60 causes them to heat, such as to at least about 183 degrees C. Unlike the prior art bypass device 10 wherein the fusible material 24 is positioned a distance away from the diode 22, in example implementations of the present disclosure, the mass of a fusible material 64 is positioned directly next to diode 60*a* and in close proximity to the second diode 60*b*, thereby eliminating the thermal path associated with the prior art bypass device 10. More specifically, as the diodes 60 conduct heat, the fusible material 64, which is closely coupled and in physical contact with the diodes 60, begins to melt. In example implementations of the present disclosure, the fusible material 64 is eutectic solder, which is an alloy commonly used in electronic assembly that melts at about 183 degrees C. An example ratio of lead to tin in eutectic solder is $Sn_{63}Pb_{37}$.

Figure 5:
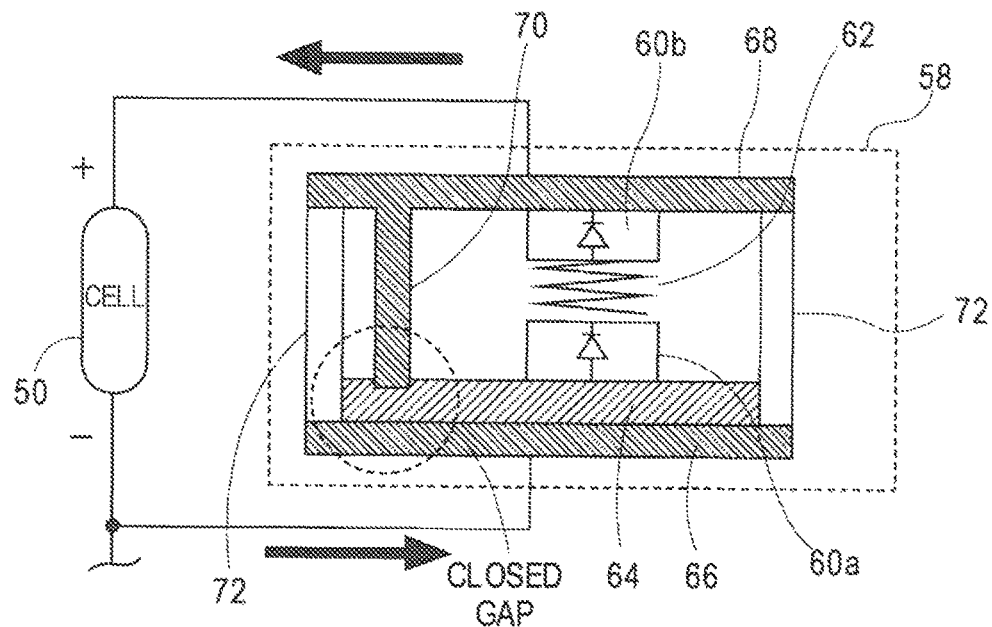
FIG. 5 is a schematic diagram of a battery bypass device after activation according to an example implementation of the present disclosure.

Referring now to FIG. 5, as the fusible material 64 melts from the heat of the diodes 60 and becomes at least partially molten, such molten material 64 remains trapped within the chamber and, therefore, moves towards the shorting gap 74 under the influence of the spring's 62 biasing force against the diodes 60 and the fusible material 64. Eventually, the molten fusible material 64 fills the shorting gap 74 to provide an electrically conductive, low resistance, bridge between the first conductor 66 and the second conductor 68 via the conductive web 70, which conductive bridge is retained even after the fusible material 63 re-solidifes. The newly created electrical path is bidirectional, in that it allows current to flow in either direction, thereby allowing for battery cell 50 charging and discharging. For example, during battery cell 50 discharging, current flows from the first conductor 66 through the fusible material 64 filled gap, the conductive web 70, and the second conductor 68.

Figure 6:
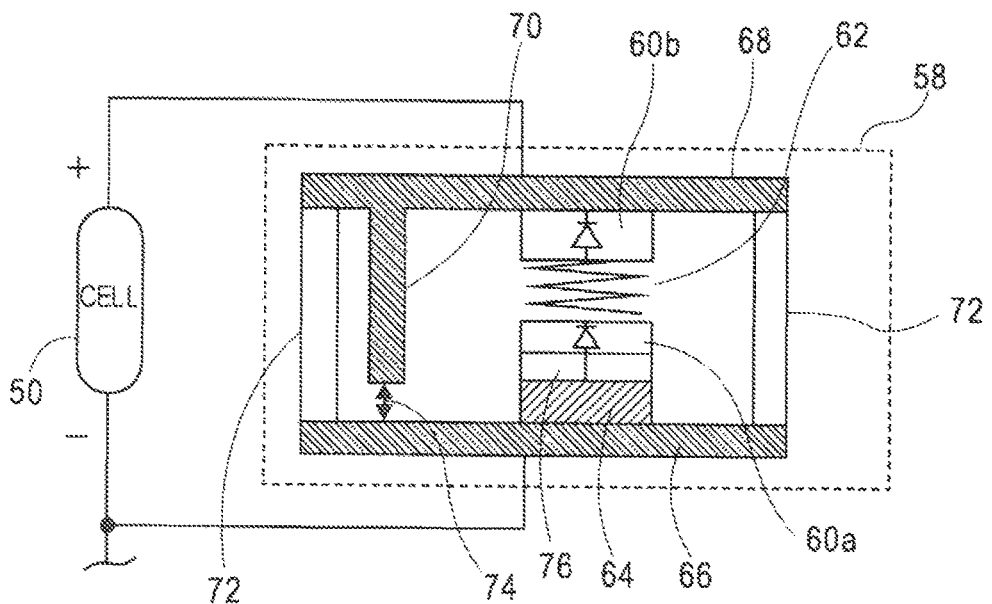
FIG. 6 is a schematic diagram of a battery bypass prior to activation according to an additional implementation of the present disclosure.

In yet a further implementation of the present disclosure shown in FIG. 6, the bypass device 58 further includes an electrically conductive, but non-melting spreader 76 comprise of a material such as copper. The spreader 76 is disposed within the chamber between the fusible material 64 and the first diode 60*a*. In this implementation, because of the spreader 76, the collective mass of the first diode 60*a*, spreader 76, fusible material 64, and first conductor 66 (collectively, the "first diode 60*a* mass") is more than the collective mass of the second diode 60*b*, web 70, and second conductor 68 (collectively, the "second diode mass"). Because the second diode mass is less than the first diode mass, the second diode mass gets hotter during bypass 58 activation than the first diode mass. Thus, the web 70 gets hotter than the fusible material 64 which is located in the first diode mass. When the web 70 is hotter than the fusible material 64, even in its molten state, the fusible material 64 forms a stronger bond with the web 70. Conversely, if the web 70 is cooler than the fusible material 64 when the bond is formed (commonly referred to as a cold solder joint), the bond is more likely to breakdown over time. Thus, in the implementation shown in FIG. 6 wherein the web 70 is hotter than the fusible material 64 because of the second diode mass being less than the first diode mass, the bond formed between the fusible material 64 and web 70 is much stronger and less likely to breakdown over time.

Example implementations of the bypass device 58 in operation are shown in FIGS. 7A-7C. FIG. 7A depicts normal operation the battery 40, meaning that none of the cells 50 have diminished capacity or are in an open-cell condition. In this scenario, during the battery's 40 discharge operation, the battery's 40 current flows equally through each cell 50 and no current flows through the bypass devices 58. FIG. 7B depicts operation of the battery 40 during activation of a bypass device 58b because of a failure in the corresponding cell 50b. In this scenario, as the battery 40 discharges, part of the current flows through the defective cell 50b and the balance of the current flows through the bypass device 58b. As the battery 40 continues to discharge and the defective cell 50b becomes overdischarged to a higher degree, an increasingly higher proportion of the current flows through the bypass device 58b which causes the diodes 60 in the bypass device 58b to heat to activate the device 58b, as described above with respect to FIG. 4. FIG. 7C depicts operation of the battery 40 after the bypass device 58b has been activated. In this scenario, all of the current flows through the bypass device 58b and no current flows through the defective cell 50b, as described above with respect to FIG. 5.

According to the example implementations of the present disclosure, the improved bypass device 58 is fault tolerant unlike the prior art device 10 because the bypass device 58 utilizes two diodes 60, operating in electrical series, for activation of the device 58. Thus, if one of the diodes 60 fails when the cell 50 is not defective, the other diode 60 will prevent the device 58 from activating prematurely. Additionally, by closely coupling the diodes 60 with the fusible material 64, such as by physical contact, the bypass device 58 of the present disclosure provides for better heat transfer between the pair of diodes and the fusible material 64. Because the heat doesn't have to travel a thermal path, as in the prior art device 10, the bypass device 58 of the present disclosure can be activated at lower currents, thereby making the device 58 more likely to short the lithium ion cell before the cell can form copper plating and short internally. Additionally, because of the fusible material's 64 close coupling with the diodes 60, the bypass device 58 may utilize a lower volume of fusible material 64 than in the prior art device 10. In yet a further improvement over the prior art device 10, the bypass device 58 of the present disclosure provides an enclosed chamber for entrapping the molten fusible material 64 when the device 58 is activated. This results in a significantly higher likelihood that the molten fusible material 64 will fill the shorting gap 70, unlike the prior art device 10 wherein the molten fusible material is unconstrained so directional flow of the molten is not definite or predictable.

It should be understood that variations on the general principals of the invention are possible. For example, in some implementations of the present disclosure, the enclosed chamber of the bypass device 58 may include only one diode as a heating device. Also, a number of practical aspects have been omitted from the description that should be obvious to a practitioner skilled in the art.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the spirit and scope of the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A battery system comprising:
an electrical storage cell having a positive terminal and a negative terminal;
a normally open bypass circuit path comprising:
    a first electrical conductor connected to the negative terminal of the electrical storage cell;
    a second electrical conductor connected to the positive terminal of the electrical storage cell; and
    a shorting gap between the first electrical conductor and the second electrical conductor,
a mass of electrically conductive fusible material;
first and second diodes electrically connected in series,
    each of the first and second diodes having a cathode and an anode, the anode of the first diode being electrically connected to the negative terminal of the electrical storage cell and the cathode of the second diode being electrically connected to the positive terminal of the electrical storage cell,
    each of the first and second diodes being heat source activatable upon the occurrence of a voltage reversal of the electrical storage cell, and
    the first diode having a sufficient heat output to melt the mass of the fusible material;
a biasing mechanism positioned to force the mass of the fusible material into the shorting gap, when the mass of the fusible material is at least partially molten, thereby closing the shorting gap so that the first electrical conductor is in electrical communication with the second electrical conductor; and
a nonconductive barrier disposed between the first electrical conductor and the second electrical conductor to define a bypass chamber that encloses the mass of fusible material, first and second diodes, biasing mechanism, and shorting gap, wherein the bypass chamber is configured to entrap the mass of the fusible material when it is at least partially molten.

2. The battery system of claim 1 wherein:
the normally open bypass circuit path further comprises an electrically conductive web that it is electrically connected to the second conductor, the web being disposed within the chamber;
the shorting gap is disposed between the web and the first conductor; and
the biasing mechanism is positioned to force the mass of the fusible material into the shorting gap, when the mass of the fusible material is at least partially molten, thereby closing the shorting gap so that the first electrical conductor is in electrical communication with the second electrical conductor via the web.

3. The battery system of claim 2 wherein the second diode has a sufficient heat output to heat the web.

4. The battery system of claim 1 wherein the chamber further encloses an electrically conductive spreader that is disposed between the fusible material and the first diode.

5. The battery system of claim 1 wherein the fusible material is a metal.

6. The battery system of claim 1 wherein the fusible material is a metal alloy.

7. The battery system of claim 1 wherein the fusible material is a lead tin alloy.

8. The battery system of claim 1 wherein the fusible material has a melting point of no more than about 183 degrees C.

9. The battery system of claim 1 wherein the biasing mechanism comprises a spring positioned to move the mass of fusible material toward the shorting gap when the fusible material is at least partially molten.

10. The battery system of claim 1 further comprising a second electrical storage cell in an electrical series relationship.

11. A battery system comprising:
an electrical storage cell having a positive terminal and a negative terminal;
a normally open bypass circuit path comprising:
a first electrical conductor connected to the negative terminal of the electrical storage cell;
a second electrical conductor connected to the positive terminal of the electrical storage cell; and
a shorting gap between the first electrical conductor and the second electrical conductor;
a mass of fusible material;
a heat source activatable upon the occurrence of a voltage reversal of the electrical storage cell, the heat source being operable to melt at least a portion of the mass of the fusible material; and
a biasing mechanism positioned to force the mass of the fusible material into the shorting gap when the mass of the fusible material is at least partially molten, thereby closing the shorting gap so that the first electrical conductor is in electrical communication with the second electrical conductor;
wherein the mass of fusible material, heat source, shorting gap and biasing mechanism are disposed within an enclosed bypass chamber defined by the first electrical conductor, the second electrical conductor, and a non-conductive barrier disposed between the first electrical conductor and the second electrical conductor; and
wherein the bypass chamber is configured to entrap the mass of the fusible material when it is at least partially molten.

12. The battery system of claim 11 wherein:
the normally open bypass circuit path further comprises an electrically conductive web that it is electrically connected to the second conductor within the chamber such that the shorting gap is disposed between the web and the first conductor; and
the biasing mechanism positioned to force the mass of the fusible material into the shorting gap, when the mass of the fusible material is at least partially molten, thereby closing the shorting gap so that the first electrical conductor is in electrical communication with the second electrical conductor via the web.

13. The battery system of claim 11, wherein the heat source comprises a first diode and a second diode that are electrically connected in series.

14. The battery system of claim 11 wherein the bypass chamber further encloses an electrically conductive spreader that is disposed between the fusible material and the first diode.

15. The battery system of claim 12 wherein:
each of the first and second diodes has a cathode and an anode;
the anode of the first diode is electrically connected to the negative terminal of the electrical storage cell and the cathode of the second diode is electrically connected to the positive terminal of the electrical storage cell;
each of the first and second diodes is a heat source activatable upon the occurrence of a voltage reversal of the electrical storage cell; and
the first diode has a sufficient heat output to melt the mass of the fusible material.

16. The battery of claim 15 wherein the second diode has a sufficient heat output to heat the web.

17. The battery system of claim 11 wherein the fusible material is a metal.

18. The battery system of claim 11 wherein the fusible material is a metal alloy.

19. The battery system of claim 11 wherein the fusible material is a lead tin alloy.

20. The battery system of claim 11 wherein the fusible material has a melting point of no more than about 183 degrees C.

21. The battery system of claim 11 wherein the biasing mechanism comprises a spring positioned to move the mass of fusible material toward the shorting gap when the fusible material is at least partially molten.

22. The battery system of claim 11 further comprising a second electrical storage cell in an electrical series relationship.

23. The battery system of claim 1 wherein the first diode is positioned directly adjacent to the mass of the fusible material.

* * * * *